US007693747B2

(12) United States Patent
Bryson et al.

(10) Patent No.: US 7,693,747 B2

(45) Date of Patent: Apr. 6, 2010

(54) METHODS, SYSTEM, AND MEDIUM FOR INITIATING AN ONLINE AUCTION UTILIZING A LINE ITEM DETAIL REPORT

(75) Inventors: Michael D. Bryson, Pittsburgh, PA (US); Chris Harrington, Pittsburgh, PA (US); Jack Allamon, Pittsburgh, PA (US)

(73) Assignee: Ariba, Inc., Sunnyvale, CA (US)

(*) Notice: Subject to any disclaimer, the term of this patent is extended or adjusted under 35 U.S.C. 154(b) by 765 days.

(21) Appl. No.: 10/284,726

(22) Filed: Oct. 31, 2002

(65) Prior Publication Data

US 2004/0088223 A1 May 6, 2004

(51) Int. Cl.
*G06Q 30/00* (2006.01)
*G06F 17/30* (2006.01)

(52) U.S. Cl. .......................................... 705/26; 705/27

(58) Field of Classification Search ............. 705/26–28, 705/37

See application file for complete search history.

(56) References Cited

U.S. PATENT DOCUMENTS

| | | | |
|---|---|---|---|
| 3,581,072 | A | 5/1971 | Nymeyer |
| 3,863,060 | A | 1/1975 | Rode et al. |
| 4,597,045 | A | 6/1986 | Kiuchi |
| 4,674,044 | A | 6/1987 | Kalmus et al. |
| 4,789,928 | A | 12/1988 | Fujisaki |
| 4,799,156 | A | 1/1989 | Shavit et al. |
| 4,845,625 | A | 7/1989 | Stannard |
| 4,992,940 | A | 2/1991 | Dworkin |
| 5,136,501 | A | 8/1992 | Silverman et al. |
| 5,193,056 | A | 3/1993 | Boes |
| 5,243,515 | A | 9/1993 | Lee |
| 5,297,032 | A | 3/1994 | Trojan et al. |
| 5,375,055 | A | 12/1994 | Togher et al. |

(Continued)

FOREIGN PATENT DOCUMENTS

EP 0399850 A 11/1990

(Continued)

OTHER PUBLICATIONS

"Buyers log on for standard agent RFP". Ben Chapman. Business Travel News. San Francisco: Oct. 7, 2002. vol. 19, Iss. 20; p. 1, 3 pgs. [recovered from Proquest Database on Feb. 11, 2009].*

(Continued)

*Primary Examiner*—Jeffrey A. Smith
*Assistant Examiner*—William J. Allen
(74) *Attorney, Agent, or Firm*—Van Pelt, Yi & James LLP

(57) ABSTRACT

A system and method of initiating an online auction. The system receives a request to acquire at least one line item using the online auction from a buyer and presents a data collection template to the buyer, where the data collection template is being used to collect data having a plurality of attributes relating to the line item being auctioned in the online auction. The system also generates, in response to at least one of the attributes of the data collected from the buyer, a report showing the data including at least one of the attributes relating to the line item and transmits the report to at least one supplier.

42 Claims, 11 Drawing Sheets

U.S. PATENT DOCUMENTS

| | | | | |
|---|---|---|---|---|
| 5,394,324 | A | 2/1995 | Clearwater | |
| 5,402,336 | A | 3/1995 | Spiegelhoff et al. | |
| 5,606,602 | A | 2/1997 | Johnson et al. | |
| 5,629,982 | A | 5/1997 | Micali | |
| 5,640,569 | A | 6/1997 | Miller et al. | |
| 5,664,115 | A | 9/1997 | Fraser | |
| 5,684,963 | A | 11/1997 | Clement | |
| 5,689,652 | A | 11/1997 | Lupien et al. | |
| 5,715,402 | A | 2/1998 | Popolo | |
| 5,727,165 | A | 3/1998 | Ordish et al. | |
| 5,758,327 | A | 5/1998 | Gardner et al. | |
| 5,758,328 | A | 5/1998 | Giovannoli | |
| 5,765,138 | A | 6/1998 | Aycock et al. | |
| 5,774,873 | A | 6/1998 | Berent et al. | |
| 5,794,207 | A | 8/1998 | Walker et al. | |
| 5,794,219 | A | 8/1998 | Brown | |
| 5,797,127 | A | 8/1998 | Walker et al. | |
| 5,799,151 | A | 8/1998 | Hoffer | |
| 5,799,285 | A | 8/1998 | Klingman | |
| 5,802,502 | A | 9/1998 | Gell et al. | |
| 5,803,500 | A | 9/1998 | Mossberg | |
| 5,809,483 | A | 9/1998 | Broka et al. | |
| 5,826,244 | A | 10/1998 | Huberman | |
| 5,832,496 | A | 11/1998 | Anand et al. | |
| 5,835,896 | A | 11/1998 | Fisher et al. | |
| 5,862,223 | A | 1/1999 | Walker et al. | |
| 5,890,138 | A | 3/1999 | Godin et al. | |
| 5,897,621 | A | 4/1999 | Boesch et al. | |
| 5,905,974 | A | 5/1999 | Fraser et al. | |
| 5,905,975 | A | 5/1999 | Ausubel | |
| 5,915,209 | A | 6/1999 | Lawrence | |
| 5,966,699 | A | 10/1999 | Zandi | |
| 6,014,627 | A | 1/2000 | Togher et al. | |
| 6,021,398 | A | 2/2000 | Ausubel | |
| 6,023,685 | A | 2/2000 | Brett et al. | |
| 6,044,363 | A | 3/2000 | Mori et al. | |
| 6,055,518 | A | 4/2000 | Franklin et al. | |
| 6,058,379 | A | 5/2000 | Odom et al. | |
| 6,061,663 | A | 5/2000 | Bloom et al. | |
| 6,078,906 | A | 6/2000 | Huberman | |
| 6,119,229 | A | 9/2000 | Martinez et al. | |
| 6,151,589 | A | 11/2000 | Aggarwal et al. | |
| 6,161,099 | A | 12/2000 | Harrington et al. | |
| 6,199,050 | B1 | 3/2001 | Alaia et al. | |
| 6,266,652 | B1 | 7/2001 | Godin et al. | |
| 6,275,807 | B1 | 8/2001 | Schirripa | |
| 6,341,270 | B1 * | 1/2002 | Esposito et al. | 705/26 |
| 6,366,891 | B1 | 4/2002 | Feinberg | |
| 6,647,373 | B1 * | 11/2003 | Carlton-Foss | 705/37 |
| 6,768,994 | B1 * | 7/2004 | Howard et al. | 707/10 |
| 2001/0032175 | A1 * | 10/2001 | Holden et al. | 705/37 |
| 2001/0037256 | A1 * | 11/2001 | Yazawa et al. | |
| 2001/0051913 | A1 * | 12/2001 | Vashistha et al. | 705/37 |
| 2002/0007324 | A1 * | 1/2002 | Centner et al. | |
| 2002/0143692 | A1 * | 10/2002 | Heimermann et al. | |
| 2003/0004656 | A1 * | 1/2003 | Bjornson | 702/34 |
| 2004/0073507 | A1 * | 4/2004 | Scott et al. | 705/37 |
| 2004/0187091 | A1 * | 9/2004 | Parasnis et al. | 717/104 |
| 2004/0215467 | A1 * | 10/2004 | Coffman et al. | 705/1 |

FOREIGN PATENT DOCUMENTS

| | | |
|---|---|---|
| WO | WO 92/15174 | 9/1992 |
| WO | WO 97/37315 | 10/1997 |
| WO | WO 98/34187 | 8/1998 |
| WO | WO 99/63461 | 12/1999 |

OTHER PUBLICATIONS

"An XML Framework for Agent-based E-commerce". Glushko, Robert J.Tenenbaum, Jay M.Meltzer, Bart. Communications of the ACM; Mar. 1999, vol. 42 Issue 3, p. 106-114, 8p. [recovered from Proquest Database on Feb. 11, 2009].*

Andrews, "Auctions Catch the Interest of Hobbyists and Big Business", Aug. 24, 1998.

Associated Press, "Auction on Web is Buyer's Market", Apr. 6, 1998.

"BroadVision Developing First Interactive Commerce Management System To Support Online Sales & Marketing Process; New Software Category Necessary to Interactive Network Architecture", Business Wire, p5150152, May 15, 1995.

Danny Cohen, "Computerized Commerce", Information Processing 89, Aug. 28-Sep. 1, 1989.

"FairMarket Launches New Self-Serve Auctions", Business Wire, p6161495, Jun. 16, 1998.

Jahnke, "How Bazaar", CIO Web Business Magazine, Aug. 27, 1998.

Jean-Pierre Banatre, et al., "The Design and Building of Enchere, a Distributed Electronic Marketing System" Communications of the ACM, No. 1, Jan. 29, 1986.

Lee, "Do electronic marketplaces lower the price of goods?", Communications of the PCM, v41n1 pp. 73-80, Jan. 1998.

Malone, et al., "The Logic of Electronic Markets", Harvard Business Review, No. 893II, May-Jun. 1989.

"Moai Technologies Introduces New categories of Business to Business Auction Software . . . ", Business Editors and Computer Writers, Mar. 16, 1998.

Kikuchi, et al., "Multi-Round Anonymous Auction Protocols", IEICE Trans. Inf. & Syst., vol. E82-D, No. 4, Apr. 1999.

"Online bidding software", Electronic Buyers' News, Issue 1072, p. 86, 1/6p, Aug. 25, 1997.

Sairamesh, et al., "Economic Framework for Pricing and Charging Digital Libraries", D-Lip Magazine, Feb. 1996.

"Sold! . . . To the Lowest Bidder", Computer Finance, v6, n2, Jul. 1995.

"Venture Capitalists Fund Two Massachusetts Internet Related Companies", Boston Globe, Jan. 14, 1998.

Vigoroso, "Buyers prepare for brave new world of e-commerce", Purchasing, v126, n6, p. S4(1), Apr. 22, 1999.

Von der Fehr, et al., "Predatory bidding in sequential auctions", Oxford Economics Papers, v46, n3, p. 345(12), Jul. 1994.

"What you need to know to bid in FCC's narrowband auction", Washington Telecom News, v2, n26, p. 6(2), Jun. 27, 1994.

Wilder, "What's Your Bid?—FreeMarkets' real-time online bidding technology lets clients drive downcosts and improve product value", InformationWeek, Nov. 10, 1997.

Woolley, "E-muscle", Forbes, Mar. 9, 1998.

M. Reck, "Types of Electronic Auctions", Hochschule St. Gallen.

C. Wrigley, "Design Criteria For Electronic Market Servers", Electronic Markets, vol. 7, No. 4, 1997.

Wurman, et al., "The Michigan Internet AuctionBot: A Configurable Auction Server for Human and Software Agents", Artificial Intelligence Laboratory, University of Michigan, 1998.

Patent Abstracts of Japan, Publication No. 09101994, Apr. 15, 1997, Fujitsu General Ltd., Inventor: Inda Fusao, Application No. 07260511, Date of Filing: Oct. 6, 1995, 1 page.

Patent Abstracts of Japan, Publication No. 10-078992, Mar. 24, 1998, Hitachi Ltd., Inventor: Mora Masakatsu, et al., Application No. 08-233918, Date of Filing: Sep. 4, 1996, 2 pages.

* cited by examiner

METHODS, SYSTEM, AND MEDIUM FOR INITIATING AN ONLINE AUCTION UTILIZING A LINE ITEM DETAIL REPORT

FIELD OF THE INVENTION

The invention relates generally to conducting online electronic auctions, and in particular, an automated line item display.

BACKGROUND OF THE INVENTION

It is believed that procurement of goods and services has traditionally involved high transaction costs. The cost of finding and qualifying potential bidders has been particularly high. The advent of electronic commerce, however, has introduced new methods of procurement that lower some of the transaction costs associated with procurement. Electronic procurement, and in particular business-to-business electronic procurement, matches buyers and suppliers and facilitates transactions that take place on networked systems.

Supplier-bidding auctions for products and services defined by a buyer have been developed. In a supplier-bidding auction, bid prices may start high and move downward in reverse-auction format as suppliers interact to establish a closing price. The auction marketplace is often one-sided, i.e., one buyer and many potential suppliers. It is believed that, typically, the products being purchased are components or materials. "Components" may mean fabricated tangible pieces or parts that become part of assemblies of durable products. Example components include steering wheels, gears, bearings, appliance shelves, or door handles. "Materials" may mean bulk quantities of raw materials that are further transformed into product. Example materials include corn syrup or sheet steel.

Industrial buyers may wish to purchase more than one component or material at a time. More specifically, they may wish to purchase whole families of similar components or materials in order to achieve economic means of scale. These items (i.e., similar lines of components or materials) may be grouped into a single lot. That is, a lot may include one or more of similar components or materials, each of which constitutes a line item. Suppliers in industrial auctions may provide unit price quotes for one or more line items in a lot.

Furthermore, industrial buyers not only purchase more than one component or material at a time, but also they purchase components or materials in relatively high frequency within a given period of time (e.g., two or more times a year). As noted, these components or materials typically undergo further processing. For example, steering wheels may need to be fitted specifically for particular motor vehicles. As such, these components and/or materials must meet specific standards (or specifications). These standards, along with other pertinent information relating to the line items, are typically conveyed from a buyer 10 to suppliers 30 using a report.

Creating a report that outlines detailed specifications relating to items in an online auction may be a time consuming, arduous task. For instance, all relevant data relating to the specification of the items must be collected from the buyer prior to generating a report. Once the data is collected, it may be used to generate a detailed report that is distributed to one or more selected suppliers. In some instances, however, relevant information must be carefully selected from the data prior to generating a report. For instance, each supplier may desire certain requirements on the report, and, as such, the report may need to be tailored for each supplier. An operator typically enters this information manually in a given form to create the detailed report for each individual supplier. This process not only increases time requirement, often taking several hours to create a report for one supplier, but also increases a risk of entering wrong information in the report.

Thus, it is believed that there is a need for system and method of streamlining a data collection process for an online auction. In addition, it is believed that there is a need for system and method of streamlining a report generation process for an online auction.

SUMMARY OF THE INVENTION

The present invention is directed to a method in a system for initiating an online auction. The method comprises receiving a request to acquire at least one line item from a buyer and presenting a data collection template to the buyer, where the data collection template is being used to collect data having a plurality of attributes relating to the at least one line item being auctioned. The method also comprises generating, in response to at least one of the attributes of the data collected from the buyer, a report showing the data, including at least one of the attributes relating to the line item, and transmitting the report to at least one supplier.

The present invention is also directed to a system for initiating an online auction. The system comprises means for receiving a request to acquire at least one line item from a buyer, means for presenting a data collection template to the buyer, where the data collection template is being used to collect data having a plurality of attributes relating to the at least one line item being auctioned, means for generating, in response to at least one of the attributes of the data collected from the buyer, a report showing the data, including at least one of the attributes relating to the line item, and means for transmitting the report to at least one supplier.

The present invention is also directed to a machine readable medium for initiating an online auction. The machine readable medium comprises a first machine readable code that receives a request to acquire at least one line item from a buyer, a second machine readable code that presents a data collection template to the buyer, where the data collection template is being used to collect data having a plurality of attributes relating to the at least one line item being auctioned, a third machine readable code that generates, in response to at least one of the attributes of the data collected from the buyer, a report showing the data including at least one of the attributes relating to the line item, and a fourth machine readable code that transmits the report to at least one supplier.

The present invention is also directed to a method in a system for an online auction. The method comprises receiving a request from a first computer system communicatively coupled to a network, where the request relates to at least one line item, generating, in response to the request, a line item detail template that includes a plurality of fields adaptable for receiving inputted data having a plurality of attributes specifically relating to the line item, presenting the line item detail template to the first computer system, accepting the line item detail template with the inputted data from the first computer system, creating a line item detail report using the line item detail template with the inputted data, and transmitting the line item detail report to a second computer communicatively coupled to the network.

The present invention is also directed to a method in a system for conducting an online auction. The method comprises acquiring at a server computer system a request to purchase at least one line item from a buyer computer system via a network, presenting a data collection template to the buyer computer system via the network, where the data collection template includes a plurality of cells adaptable for collecting data relating to the line item, and receiving the data collection template from the buyer computer system via the network.

BRIEF DESCRIPTION OF THE DRAWINGS

The accompanying drawings, wherein like reference numerals are employed to designate like parts or steps, are included to provide a further understanding of the invention, are incorporated in and constitute a part of this specification, and illustrate embodiments of the invention that together with the description serve to explain the principles of the invention.

In the drawings.

DETAILED DESCRIPTION OF THE EMBODIMENTS

Reference will now be made in detail to the preferred embodiments of the present invention, examples of which are illustrated in the accompanying drawings. It is to be understood that the Figures and descriptions of the present invention included herein illustrate and describe elements that are of particular relevance to the present invention, while eliminating, for purposes of clarity, other elements found in typical auction systems and computer networks.

The following description of the features of the present invention is presented in the context of downward-based (i.e., reverse) online auctions. However, as would be appreciated by one of ordinary skill in the relevant art, these inventive features could also be applied in the context of upward-based (i.e., forward) online auctions as well.

Online Auction Network System

Figure 1:
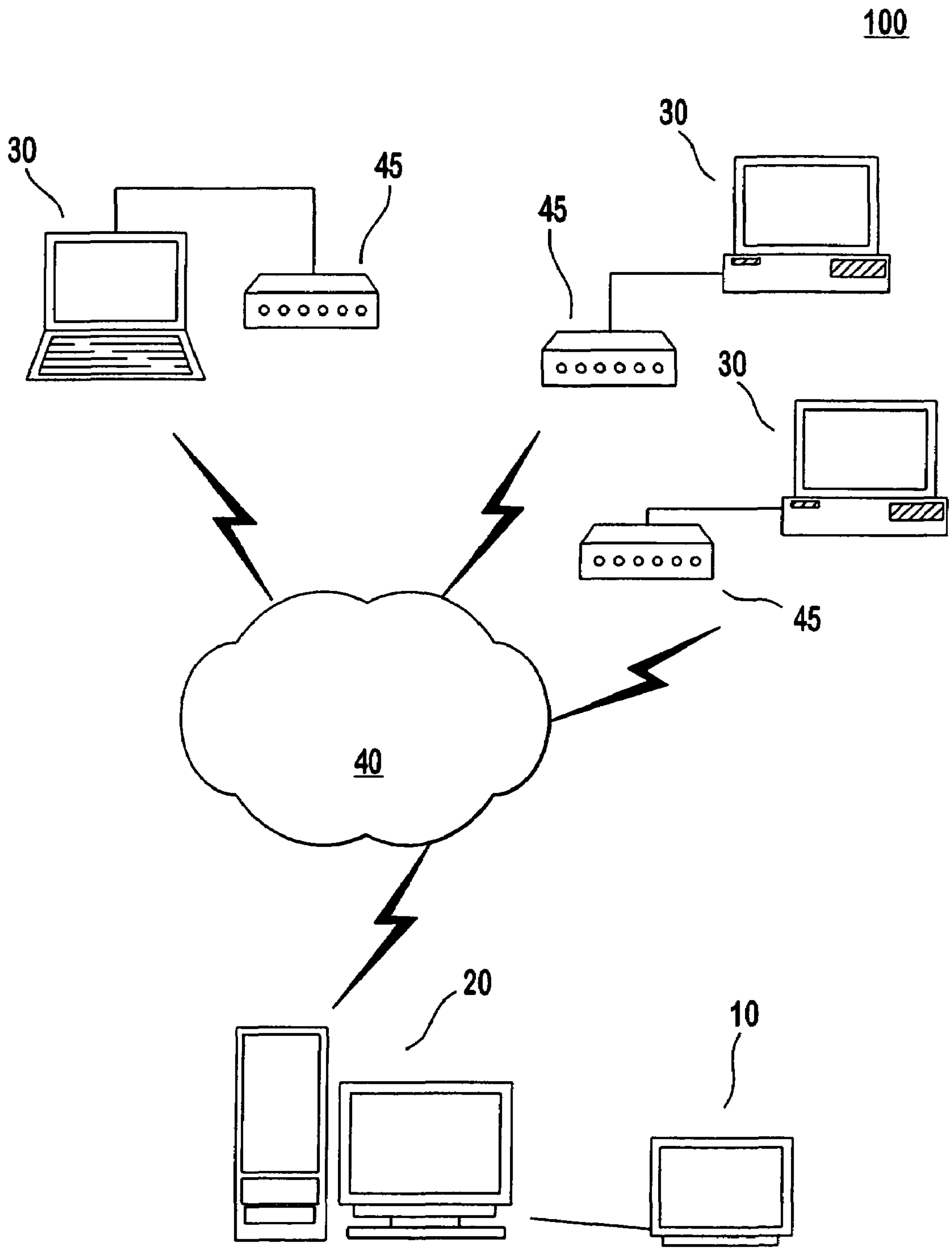
FIG. 1 shows a diagram of one embodiment showing an online auction network system of the present invention.

In accordance with one aspect of the present invention, a novel system and method for facilitating online auctions is provided. One embodiment of the present invention relating to an online auction using a network system 100 is illustrated in FIG. 1. Network system 100 facilitates providing effective and dynamic online auction by allowing bidders 30, online auctioneer 20, and sponsor or buyer 10 to conduct traditional auction at any time and any place using any computer system and the like, such as a personal computer. As described in further below, a computer system that can be used in network system 100 includes any processor-based computer coupled to a memory.

As shown in FIG. 1, information may be conveyed between the coordinator 20 and the bidders 30 via any communications medium. Using a computer system, bidders 30 may be connected to the auction via network 40. In accordance with one aspect of the present invention, network 40 can be any type of network systems such as a Local Area Network, a Wide Area Network, or even a global network, such as the Internet. For example, using a computer system coupled to a modem 45, bidders 30 may connect to the auction via an existing dial-up telephone line. Alternatively or additionally, sponsors 10 and bidders 30 may be coupled to the auction by communicating directly with auction coordinator 20 through a public switched telephone network, a wireless network, or any other connection. In accordance with another aspect of the present invention, network 40 can even be an intranet.

System Architecture

Figure 2:
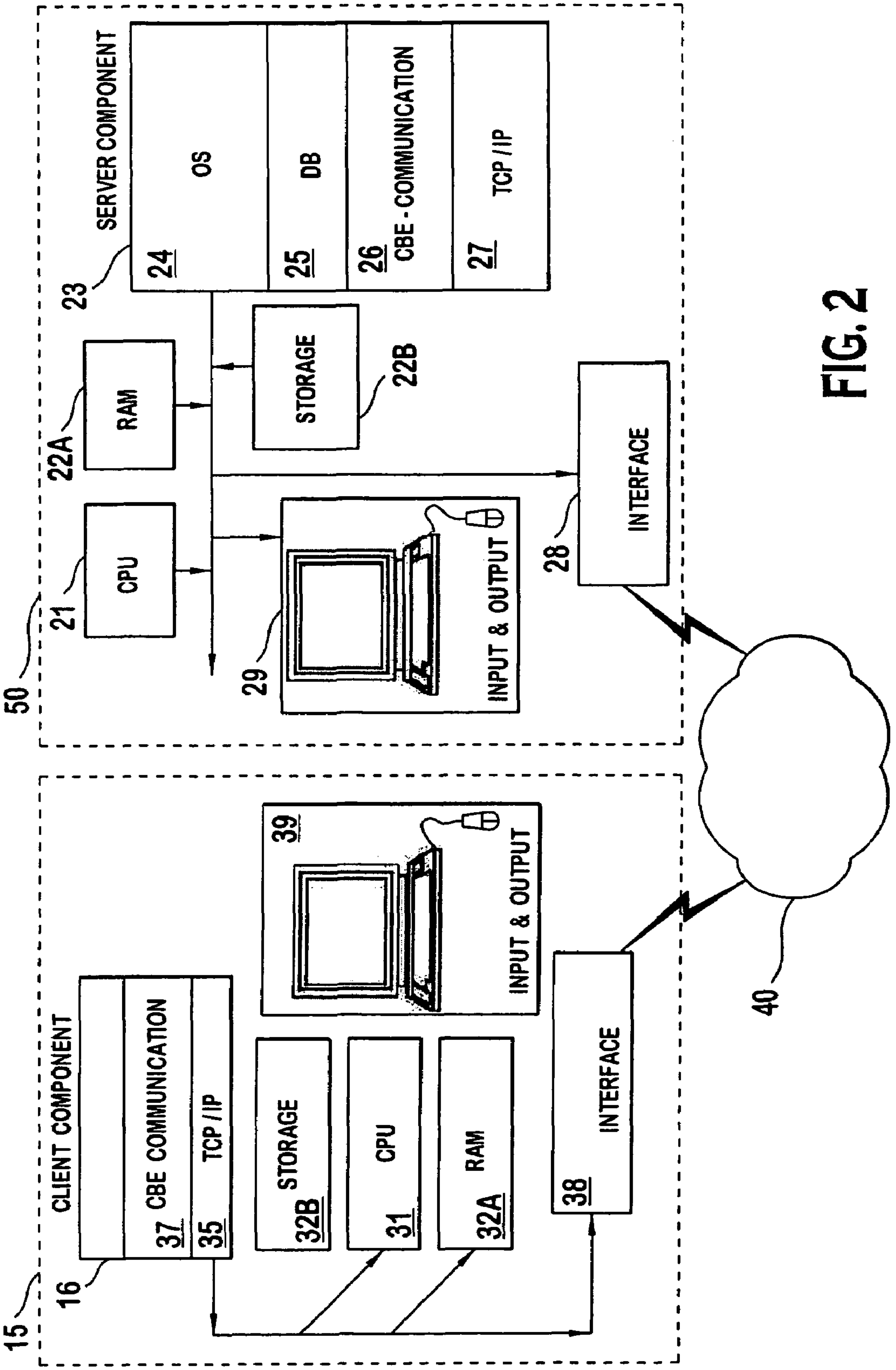
FIG. 2 is a schematic illustration of auction software and computers hosting that software in an auction.

In accordance with one aspect of the present invention, a computer software application may be used to manage the auction. Preferably, as shown in FIG. 2, the computer software application has two computer systems 15 and 50, each having its own component: a client component 16 and a server component 23, respectively. In one embodiment, computer systems 15 and 50 are used by bidder 30 and auctioneer 20 or sponsor 10, respectively, to conduct an online auction over network 40.

The client component 16 may operate on a computer at the site of any one of the bidders 30. Bidders 30 place bids during the auction using the client component 16. The bids may be sent via network 40 to the site of the coordinator 20, where it is received by server component 23 of the software application. The client component 16 may include software used to make a connection through telephone lines, cables or the Internet to the server component 23. Bids may be submitted over this connection and updates may be sent to the connected suppliers. In one embodiment of the present invention, bids may only be submitted using client component 16. This ensures that buyers do not circumvent the bidding process and that only invited suppliers participate in the bidding.

In accordance with one aspect of the present invention, bidders 30 view their bids and bids placed by other suppliers for each lot on the client component 16. When a bidder 30 submits a bid, that bid is sent to the server component 23 and evaluated to determine whether the bid is from an authorized bidder and whether the bid has exceeded a predetermined maximum acceptable price. In accordance with another aspect of the present invention, a bid placed by a supplier is broadcast to all connected bidders, thereby enabling every participating bidder to quickly view the change in market conditions and begin planning competitive responses.

In accordance with one aspect of the present invention, computer system 50 includes one or more databases 25. Databases 25 are used for receiving and storing bid information and bidder information from bidders 30. Databases 25 are also used for receiving and storing components and/or material information and buyer information from buyers 30. As described in more detail below, in accordance with one aspect of the present invention, databases 25 include a plurality of data collection templates and a plurality of report templates, both of which are used to promote dynamic online auctions.

Databases 25 are iterative. Thus, databases 25 receive information (from bidders 30 and buyers 10) and use the information to populate data in the databases 25. In accordance with another aspect of the present invention, databases 25 also receive and store software for, among other things, determining or updating market positions of the bidders 30 and displaying feedback information. As described in more detail below, databases 25 also include software for receiving from a buyer a request to acquire one or more line items, presenting a data collection template to the buyer, wherein the data collection template is used to collect data relating to the line items, generating a report showing the data relating to the line items, and transmitting the report to one or more suppliers.

As shown in FIG. 2, databases 25 are operatively coupled to server component 23. In accordance with one aspect of the present invention, databases 25 are placed remotely, away from server component 23. Alternatively or additionally, in one embodiment, storage 22B includes other databases that provide the functionality of databases 25.

In accordance with one aspect of the present invention, computer system 50 operates to execute the functionality for server component 23. Computer system 50 may comprise any processor-based computer system, such as a personal computer or server. Computer system 50 includes a processor 21, a memory 22A and a disk storage 22B. Memory 22A stores computer program instructions and data. Processor (or CPU) 21 executes the program instructions or software and processes the data stored in memory 22A. Disk storage 22B stores data to be transferred to and from memory 22A. Note that disk storage 22B can be used to store data that is typically stored in databases 25. Computer system 50 further includes I/O device 29 for entering input data and for receiving output data. I/O device 29 may be any I/O device, such as a keyboard, mouse, monitor, facsimile, etc. These and other types of I/O devices will be apparent to those skilled in the art and are within the scope of the present invention.

All of these elements are interconnected by one or more buses (or other means of interconnects), which allow data to be intercommunicated between the elements. Note that memory 22A is accessible by processor 21 over a bus and includes an operating system, a program partition and a data partition. The program partition stores and allows execution by processor 21 of program instructions that implement the functions of each respective system described herein. The data partition is accessible by processor 21 and stores data used during the execution of program instructions.

For purposes of this application, memory 22A and disk 22B are machine readable mediums and may include any medium capable of storing instructions adapted to be executed by a processor. Some examples of such mediums include, but are not limited to, read-only memory (ROM), random-access memory (RAM), programmable ROM, erasable programmable ROM, electronically erasable programmable ROM, dynamic RAM, magnetic disk (e.g., floppy disk and hard drive), optical disk (e.g., CD-ROM), optical fiber, electrical signals, lightwave signals, radio-frequency (RF) signals and any other device or signal that can store digital information. In one embodiment, the instructions are stored on the medium in a compressed and/or encrypted format. As used herein, the phrase “adapted to be executed by a processor” is meant to encompass instructions stored in a compressed and/or encrypted format, as well as instructions that have to be compiled or installed by an installer before being executed by the processor. Further, system 50 may contain various combinations of machine readable storage devices, which are accessible by processor 21 and which are capable of storing a combination of computer program instructions and data.

Computer system 50 also includes a network interface 28. Network interface 28 may be any suitable means for controlling communication signals between network devices using a desired set of communications protocols, services and operating procedures. Communication protocols are layered, which is also referred to as a protocol stack, as represented by operating system 24, CBE-communication layer 26, and Transport Control Protocol/Internet Protocol (TCP/IP) layer 27. Network interface 28 also includes connectors for connecting interface 28 with a suitable communications medium. Those skilled in the art will understand that network interface 28 may receive communication signals over any suitable medium, such as twisted-pair wire, co-axial cable, fiber optics, radio-frequencies, and so forth.

FIG. 2 further shows computer system 15 that operates to execute the functionality for client component 16. As shown, computer system 15 includes a processor (or CPU) 31, memory 32A, disk storage 32B, network interface 38, I/O device 39, and protocol stack having a CBE-communication layer 37 and a TCP/IP layer 35. These elements operate in a manner similar to the corresponding elements for computer system 50, and, as such, are not described further herein. As noted, in accordance with the present invention, computer systems 15 and 50 are used by bidder 30 and auctioneer 20 or sponsor 10, respectively, to conduct an online auction over network 40.

Online Auction System Process

Figure 3A:
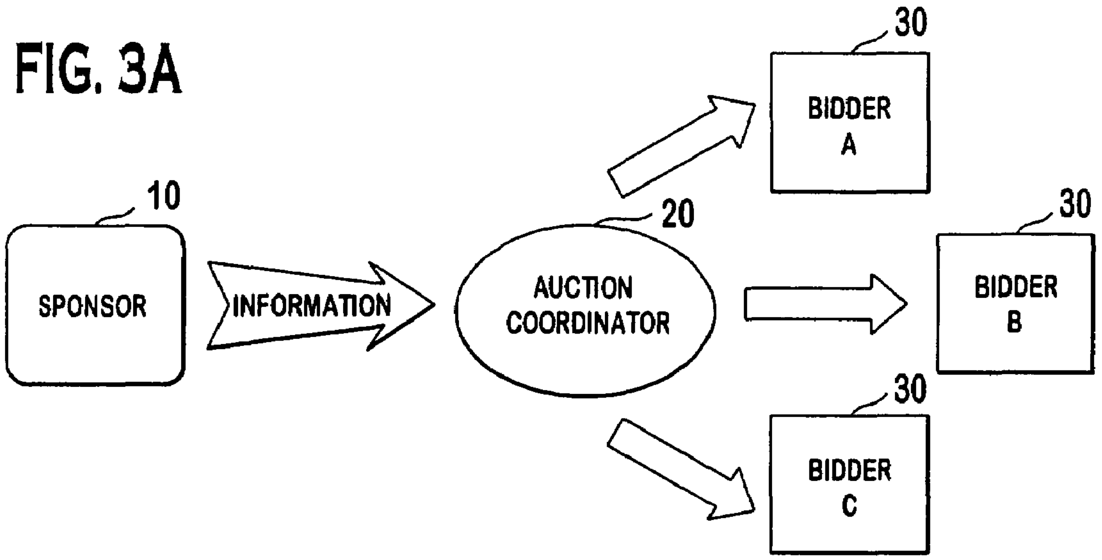
FIG. 3A is a flow diagram of a request for quotation in an auction.
Figure 3B:
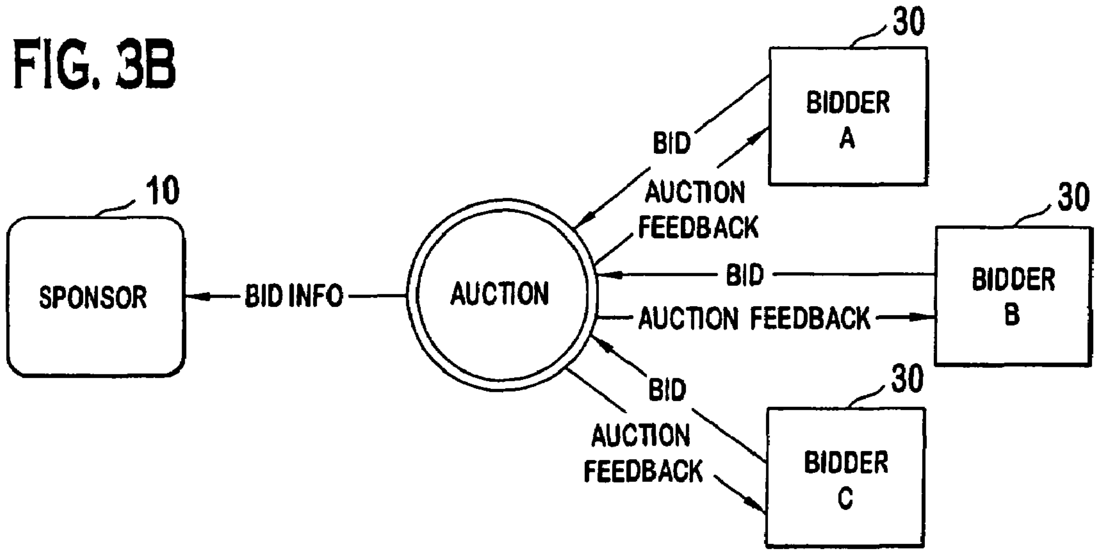
FIG. 3B is a flow diagram of a bidding process in an auction.
Figure 3C:
FIG. 3C is a flow diagram of a contract award following an auction.

The process for a buyer sponsored supplier-bidding or reverse auction is described in more detail herein with reference to FIGS. 3A-3C. As shown in FIG. 3A, in the supplier-bidding reverse auction model, the items to be purchased are, preferably, defined by the buyer or sponsor 10 of the auction. Sponsor 10 defines the items and transmits data (relating to the items) to auctioneer 20, who, in turn, conveys selected information from the data to a selected number of bidders 30. As described in detail below, the data received from buyer 10 may include, among others, information about incumbent suppliers and historic prices paid for the items to be auctioned.

The process of collecting information from sponsor 10 and conveying the selected information from the data is as follows. Preferably, sponsor 10 works with auction coordinator 20 to define the specificity of the items to be purchased in the auction and lot the items appropriately so that desired items can be procured using optimal auction dynamics. A lot may include one or more line items and suppliers in auctions may provide unit price quotes for the line items in a lot. As described in detail below, data relating to one or more line items in a lot must be accurately and completely collected from a buyer. Once the data is collected, a specification may then be prepared for each desired item, and a Request for Quotation (“RFQ”) may be generated for the auction. An RFQ may include a report that describes the specification of each item to be procured.

Next, auction coordinator 20 may identify potential suppliers, or bidders 30, preferably, with input from sponsor 10, and invite the potential suppliers 30 to participate in the upcoming auction. The suppliers 30 that are selected to participate in the auction may become bidders 30 and may then be given access to the RFQ, typically through an RFQ in a tangible form, such as on paper or in an electronic format. As described in detail below, the report may need to be customized for each supplier.

As shown in FIG. 3B, during a typical auction, bids are made for one or more line items in a lot. As noted, a lot can be further classified into several similar line items. Although bidders 30 may submit actual unit prices for all line items within a lot, the competition in an auction is typically based on the aggregate value bid for all line items within a lot. The aggregate value bid for a lot may, therefore, depend on the level and mix of line item bids and the quantity of goods or services that are offered for each line item. Thus, bidders 30 submitting bids at the line item level may actually be competing on the lot level. During the auction, sponsor 10 may monitor the bidding as it occurs. Bidders 30 may also be given market feedback during the auction so that they may bid competitively.

After the auction, auction coordinator 20 may analyze the auction results with sponsor 10. Sponsor 10 may conduct final qualification of the low bidding supplier or suppliers 30. Sponsor 10 may furthermore retain the right not to award business to a low bidding supplier 30 based on final qualification or other business concerns. As shown in FIG. 3C, a supply contract may be drawn up for the winning bidder 30 and executed based on the results of the auction.

The auction may be conducted electronically between bidders 30 at their respective remote sites and auction coordinator 20 at its site. Alternatively, instead of auction coordinator 20 managing the auction at its site, sponsor 10 may perform auction coordinator tasks at its site.

Data Collection Process

Referring again to FIG. 3A, the items to be purchased are, preferably, defined by the buyer or sponsor 10 of the auction. This is preferred since, as noted above, typical line items in a lot (to be auctioned) include "components" and/or "materials" that are further transformed into product. That is, the components and materials are not the final product, rather they represent parts of the final product. Accordingly, the buyer or sponsor 10 of the auction preferably defines the specification of the items to be purchased, as well as the number and identity of suppliers 30 that are invited to the auction.

As noted, in an online reverse auction, sponsor 10 typically includes an industrial buyer that may purchase one or more line items in a lot in relatively high frequency within a given time period. Also as noted, these items must meet certain specifications, as required by the buyer 10. Furthermore, a report describing the items must meet certain requirements to satisfy each supplier 30. Accordingly, relevant data relating to the items in an auction must be collected accurately and completely. The process of collecting data relating to the line items to be purchased is a time consuming, arduous task.

Figure 4:
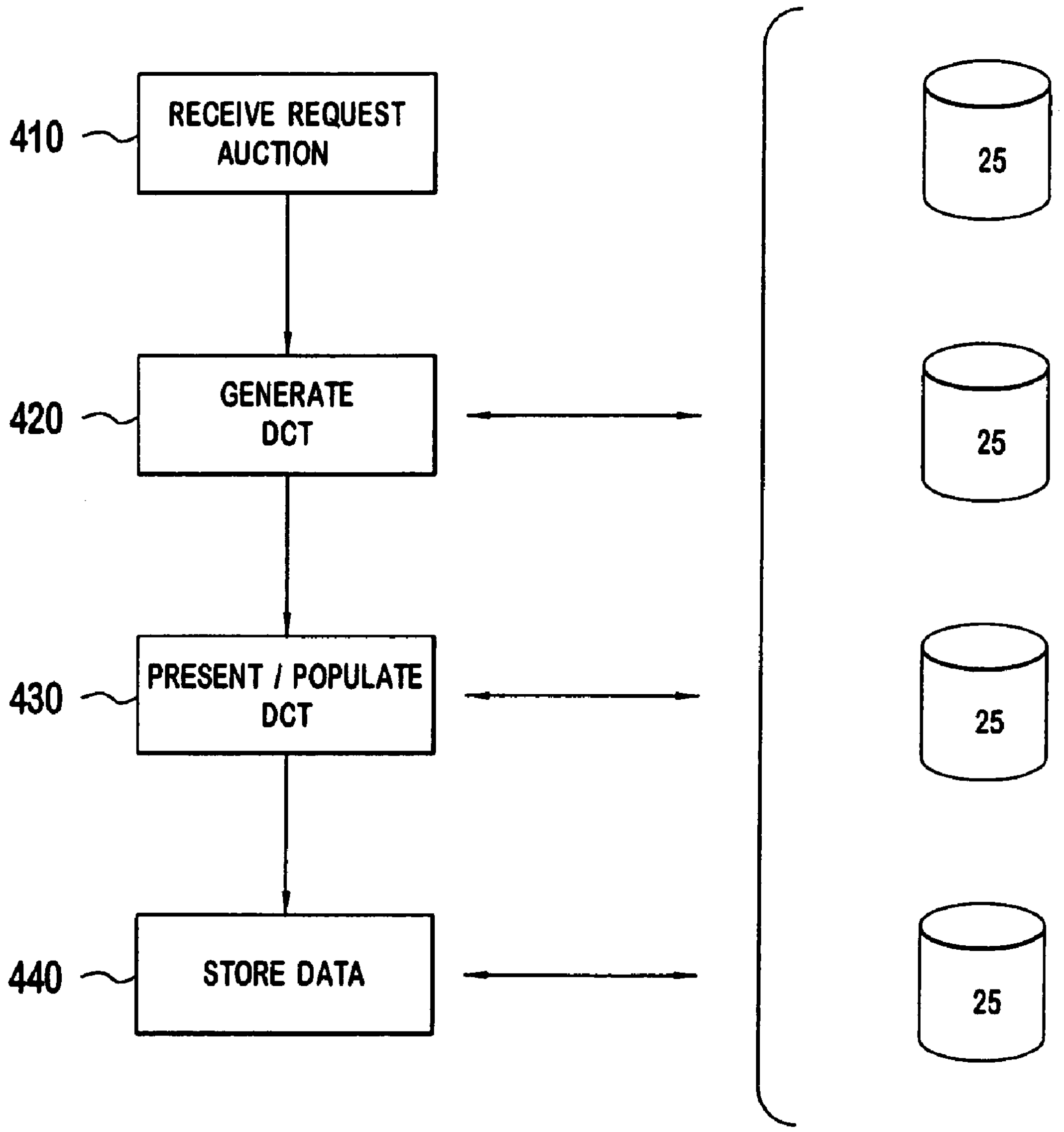
FIG. 4 is a flowchart illustrating one embodiment of the data collection process.

FIG. 4 shows a flowchart illustrating one embodiment of the data collection process, in accordance with the present invention. As shown in the flowchart, in step 410, auctioneer 20 receives from a buyer 10 a request to acquire one or more line items using an online auction. As noted, buyer 10 preferably works with auction coordinator 20 to define the specificity of the items to be purchased in the auction and lot the items appropriately so that desired items can be procured using optimal auction dynamics. Using the initial information received from the buyer 10, auctioneer 20 can determine the number and identity of suppliers 30 that are invited to participate in the auction.

It should be noted that there can be multiple attributes relating to a given line item for a given buyer 10 in an online auction. That is, there can be multiple attributes relating to a given item and how these attributes relate to a given buyer 10. Note that the attributes for a given line item and/or buyer 10 may include both quantitative and qualitative data. The quantitative data may include the specification and other relevant data describing the line items. For instance, in addition to the specification, the quantitative data could include the number of parts, etc.

The qualitative data would include certain descriptive information relating to the line items, such as a type of material or color of material. The quantitative data would also include financial figures, which relate to the line item and/or buyer 10. For instance, the financial figures may include a reserve price, market price, ceiling price, and historic price of the line item for the buyer 10. The financial figures can be used to decide which suppliers are invited to participate in the auction. Naturally, the financial figures can also be used to determine the ultimate winner of the auction.

As stated above, the data collection process for a given line item is generally a time consuming, arduous task. A given line item could have hundreds of attributes. A line item such as 100,000 steering wheels, for example, may require hundreds of attributes that describe the steering wheels. Auctioneer 20 has to determine which attributes are relevant for the purposes of acquiring the steering wheels through an online auction.

In accordance with one aspect of the present invention, a novel way of collecting data, including all relevant attributes, relating to line items in an auction is provided. After receiving the request from buyer 10, a Data Collection Template (DCT) is generated by computer system 50. As noted, DCTs are stored in electronic form in databases 25. DCT is a blank form-template that includes cells (or fields) that are adaptable for collecting attributes relating to the line items. DCTs are in electronic form, and, as such, cells (or fields) in DCTs can have controllable characteristics, such as field location and length.

It should be noted that many buyers 10 are industrial buyers who purchase items on a regular, ongoing basis. That is, a buyer 10 may acquire same or similar types of materials or components, as needed, on an ongoing basis. Since these materials or components generally share same or similar attributes, the contents (i.e., data format and list of attributes) of the DCTs used for buyer 10 tends to also be similar. As such, storing and re-using certain DCTs used previously not only saves time, but also reduces a risk of error associated with populating DCTs with inapplicable or incorrect data.

Figure 5:
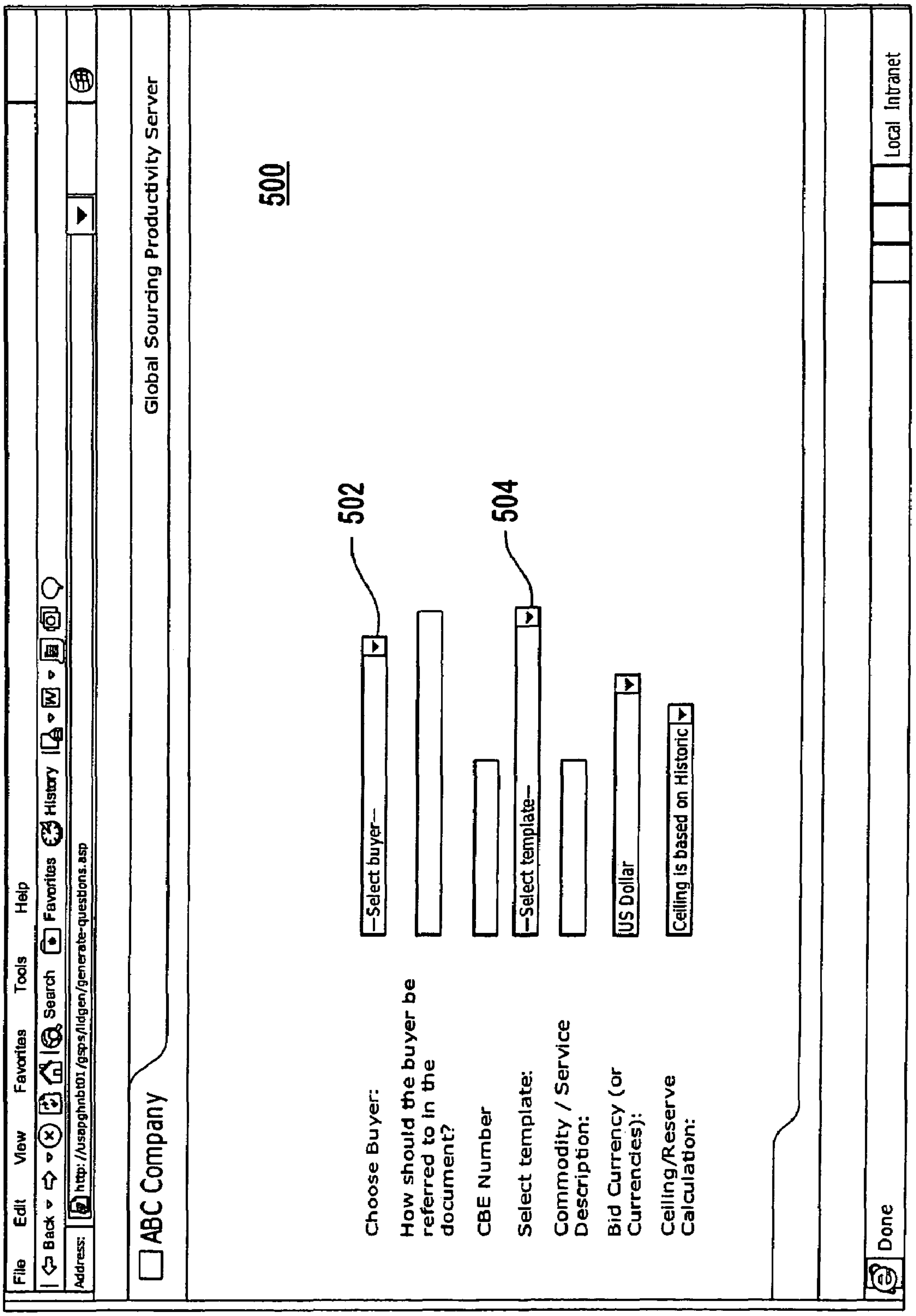
FIG. 5 shows an exemplary web page illustrating one embodiment of the data collection function.

In accordance with one aspect of the present invention, a list of appropriate DCTs for buyer 10 can be generated automatically using computer system 50. Upon receiving a request for an auction from buyer 10, a list of appropriate DCTs can be generated by consulting with databases 25, which store all DCTs used previously by that buyer 10. FIG. 5 shows an exemplary control page 500 that can be used by auctioneer 20 to select a DCT in an auction. As shown in FIG. 5, control page 500 includes several drop down boxes, including buyer menu 502 and template menu 504. Selecting a buyer 10 from buyer menu 502 provides a list of DCTs used previously by that buyer 10.

Additionally or alternatively, a specific DCT can be chosen by using template menu 504. Template menu 504 is useful for creating a specific DCT for a new buyer 10 or for an incumbent buyer 10 who is now purchasing a new line item.

Referring again to FIG. 4, after identifying buyer 10 and/or the type of materials and components, a particular DCT having a selected set of cells is generated in step 420. As noted, DCT is a blank form-template that includes cells (or fields) that are adaptable for collecting attributes relating to the line items. In accordance with one aspect of the present invention, DCTs are generated in spreadsheet formats. Thus, as described below, buyers 10 who interact with auctioneer 20 may use any popular spreadsheet application, such as Microsoft Excel® or Lotus 1-2-3®g, to populate data on DCTs electronically. Since DCTs are in spreadsheet format, each value sits in a cell. Using this feature of DCTs, auctioneer 20 may define what type of data is in each cell and how different cells depend on or interact with one another.

In accordance with one aspect of the present invention, auctioneer 20 preferably defines a relationship between or among different cells using specific formulas based on several factors, such as the type of materials or components to be acquired in an online auction, the identity of buyer 10, etc. Using a combination of formulas and labels, auctioneer 20 may generate DCTs that are logical and easy-to-use for buyers 10 while maintaining data integrity by using certain safety features, such as a write-protect command. It should be noted that DCTs act as a liaison between auctioneer 20 and buyer 10. Using DCTs, complete and accurate data, including relevant attributes, relating to line items can be collected. As described below, DCTs provide means to communicate between auctioneer 20 and buyers 10 using common spreadsheet applications, such as Microsoft Excel®.

Figure 6A:
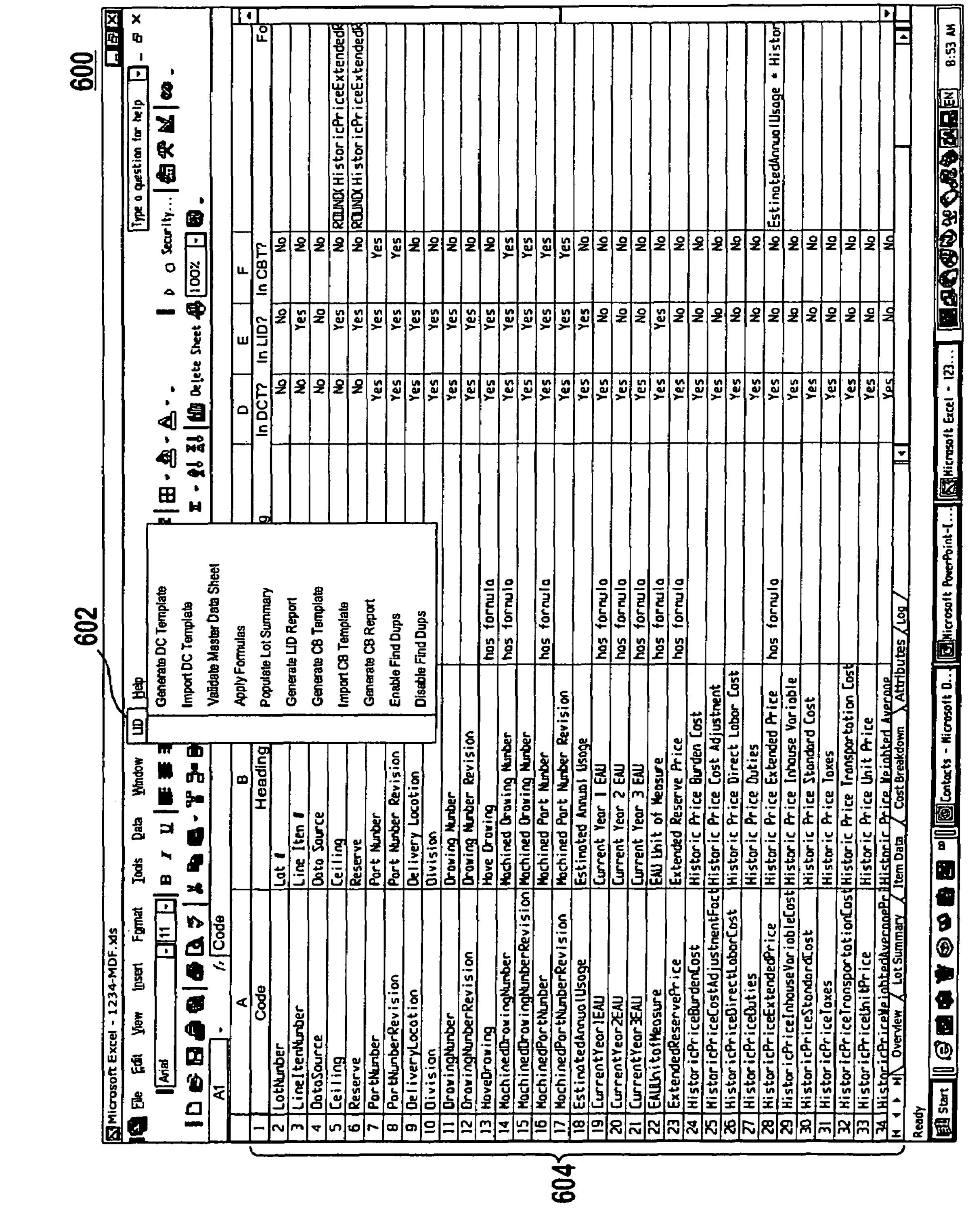
FIG. 6A shows an exemplary data control page.

FIG. 6A shows data control page 600 used by auctioneer 20 to generate a DCT for buyer 10. In accordance with one aspect of the present invention, data control page 600 is created using the Microsoft Excel®M spreadsheet application. As shown, data control page 600 includes data control tab 602, which is used to generate a DCT for buyer 10. Using data control page 600, auctioneer 20 selects an appropriate DCT for a given request of buyer 10. Note that data control tab 602 is used to select and control appropriate attributes relating to the items to be purchased. Attribute selection cells 604 are also used to select and define individual attributes relating specifically to the items and to buyer 10.

In accordance with one aspect of the present invention, data control page 600 implements Microsoft Excel® spreadsheet macro functions in a novel and useful fashion. As shown, data control tab 602 employs Microsoft Excel® macro functions to carry out the methods of the present invention. That is, data control tab 602 includes several customized Microsoft Excel® macro functions, including generating DCTs, choosing a DCT, importing a DCT, validating a generated and populated DCT, applying formulas to chosen DCT, and finding duplicate records from a generated and populated DCT.

These customized macro keys are accessible using data control tab 602. In accordance with one aspect of the present invention, unlike non-customized Microsoft Excel® macro functions, the customized macro functions can be separably controlled. That is, the customized macros "split their work" between computer system 50 and 15. Using this feature, the customized macros performs a given functionality in auctioneer 20's end and another functionality on buyer 10's end. As described below, this ability to "split work" allows the customized macros to protect, among others, the data integrity and security on computer system 50, on one side, while providing useful functionality to computer system 15, on the other side, simply by using a macro function from data control tab 602.

It should be noted that providing a dual functionality from a given customized macro, one of which functionality is operable on computer system 50 and the other functionality on computer system 15, serves important benefits. For instance, under this dual yet separably controlled configuration, buyer 10 can enjoy benefits of time saving and easy controllability afforded by the functions of the customized macro keys during data population using a DCT. Auctioneer 20 can also enjoy benefits of data integrity and security from the data received on the DCT. This configuration allows auctioneer 20 to enforce certain behavior in the business logic (e.g., by controlling certain attributes relating to the items or buyer 10), and to change this behavior in a controlled fashion at a single secured point.

As noted, DCTs act as a liaison between auctioneer 20 and buyer 10. In one embodiment, using the customized macro functions at computer system 15, buyer 10 can send a message in Extensible Markup Language (XML) to computer system 50. The message may relate to transforming, filtering, or providing other business logic functions relating to the data on the DCT.

In accordance with one aspect of the present invention, a DCT can be generated automatically without using any input from control page 500 by auctioneer 20. That is, by evaluating the initial request received from the buyer 10 in step 410, computer system 50 can automatically generate an appropriate DCT to accommodate the buyer 10's request. As noted, each line item (i.e., component or material) may include a plurality of attributes describing the item. An initial request sent by a buyer 10 would include at least one of the attributes describing the item. A buyer 10 may request, for example, 100,000 steering wheels. By matching one of the attributes, such as the part number, of the steering wheels, computer system 50 may automatically generate the DCT that has a plurality of cells (or fields) adaptable for collecting all necessary data for the steering wheels. Note that the process of automatically matching one of the attributes could be buyer-specific. Referring back to the steering wheels example, for instance, the buyer 10 may request the steering wheels for a specific end user. In such a case, computer system 50 may look up relevant data relating to the buyer 10 and its past transactions with the specific end user. The relevant data can then be retrieved from databases 25 and used to create the DCT.

Referring back to FIG. 4, upon choosing the DCT, it is presented to the buyer in step 430. The DCT is transmitted between computer systems 15 and 50 via network 40. As noted, network 40 includes popular interconnect architectures, such as a LAN or WAN. Network 40 also includes a global network, such as the Internet. In one embodiment, the DCT can be transmitted over the Internet in electronic form using popular protocols, such as Hyper Text Transfer Protocol (HTTP), Simple Network Management Protocol (SNMP), Telnet, File Transfer Protocol (FTP), and others. Thus, the DCT can be transmitted in the form of electronic mail. The DCT can also be transmitted in the form of web pages. That is, in one embodiment, buyer 10 can access computer system 50 over network 40 and "download" the DCT prepared for the buyer 10.

Accordingly, in one embodiment, a DCT is in HyperText Markup Language (HTML) format, allowing auctioneer 20 and/or buyer 10 to define and transmit data, along with selected relevant attributes, using a web browser. Alternatively or additionally, in accordance with one aspect of the present invention, a DCT is in XML format, allowing accurate and complete data transfer between buyer 10 and auctioneer 20 while maintaining data integrity and security.

Figure 6B:
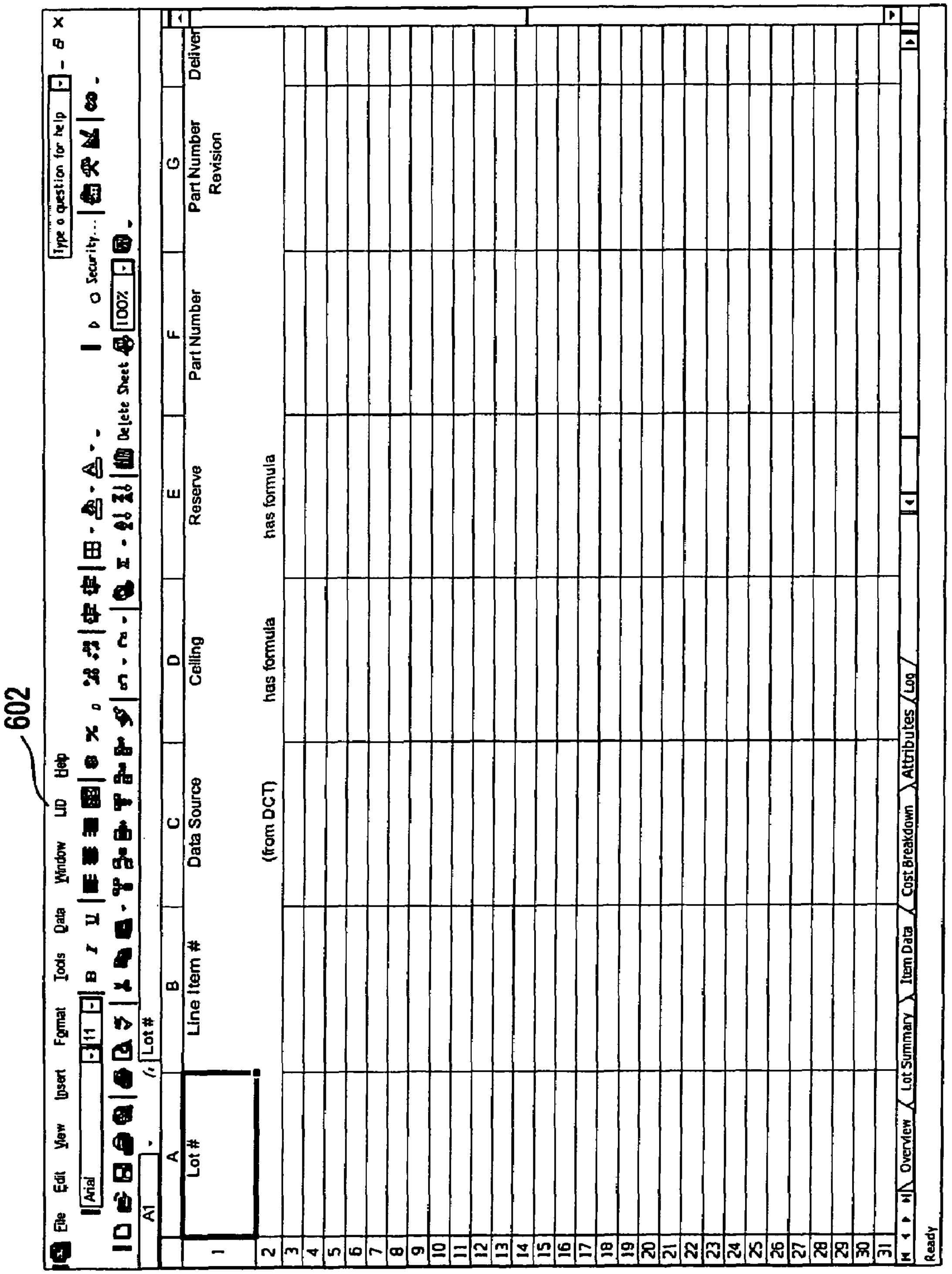
FIG. 6B shows an exemplary data collection template.

As noted, upon receiving (or downloading) the DCT, the buyer 10 may populate the DCT accordingly. FIG. 6B shows an exemplary page of a DCT generated for the buyer 10. In accordance with one aspect of the present invention, the DCT, as shown in FIG. 6B, is in the form of a spreadsheet created using the Microsoft Excel® spreadsheet application. Thus, buyer 10 can use the Microsoft Excel® spreadsheet application to fill-in the blank cells in the DCT electronically. As noted, the specificity of the line items to be acquired is generally defined by a buyer 10. The embodiment of the DCT shown in FIG. 6 facilitates the process of collecting data by specifying relevant attributes of the line items in the DCT.

In accordance with one aspect of the present invention, an embodiment of the DCT shown in FIG. 6B includes cells that are write-protected, and as such, buyer 10 cannot manipulate those cells. This feature is useful in protecting either confidential information or formulas. After completing the cells (or fields) with applicable attributes, the DCT is transmitted back to auctioneer 20 over network 40. As noted, the DCT can be transmitted using any of the popular protocols.

Note that, in accordance with one aspect of the present invention, the embodiment of FIG. 6B includes data control tab 602, which, as discussed with reference to FIG. 6A, is used to activate a set of customized Microsoft Excel® macros. Using data control tab 602, for instance, buyer 10 may perform any one of the customized Microsoft Excel® macro functions provided, such as finding duplicate records. As noted, the dual functionality feature of the customized macros ensures that certain functionalities of macros are executable only on computer system 15 while certain other functionalities of macros are executable only on computer system 50.

As noted, in accordance with one aspect of the present invention, either HTML or XML can be used to transmit and/or receive information in a form of electronic Web pages over network 40. For instance, in one embodiment, a DCT is created in XML, enabling auctioneer 20 to send the DCT, along with an intelligent agent (or a program), to buyer 10's Web site, gather data, and then make a valid comparison and validation of the data.

Alternatively or additionally, in accordance with one aspect of the present invention, as shown in step 430 of FIG. 4, the DCT can be populated automatically by computer system 50 using databases 25. As noted, databases 25 are iterative, having stored therein data relating to a given item and/or a given buyer 10. Thus, when applicable, data relating to the given item and/or buyer 10 can be used to populate the DCT without having to present the DCT to the buyer 10. This process of automatically populating DCT with applicable data saves many hours and virtually eliminates manual input from a human operator. It should be apparent that this process is very cost effective. The process also reduces risks of error resulting from human input.

In step 440, as shown in FIG. 4, the data received (or populated) is stored in databases 25. As described in more detail below, using this data, an RFQ can be generated. The data can also be used to populate subsequent DCTs for the buyer 10.

Report Generation Process

Referring again to FIG. 3A, after the initial request, along with other relevant data, for one or more line items is received from sponsor 10, auctioneer conveys relevant information to selected suppliers 30 who are invited to bid for the items in an auction. That is, once the data is collected, a specification may then be prepared for each desired item, and an RFQ may be generated for the auction. As noted, an RFQ may include a report that describes the specification of each item to be procured by the buyer 10. Like that of data collection, the process of report generation can be quite time consuming and arduous. This is especially true since each supplier may require a unique report format. Using the inventive method and system, the process is report generation is also streamlined.

Figure 7:
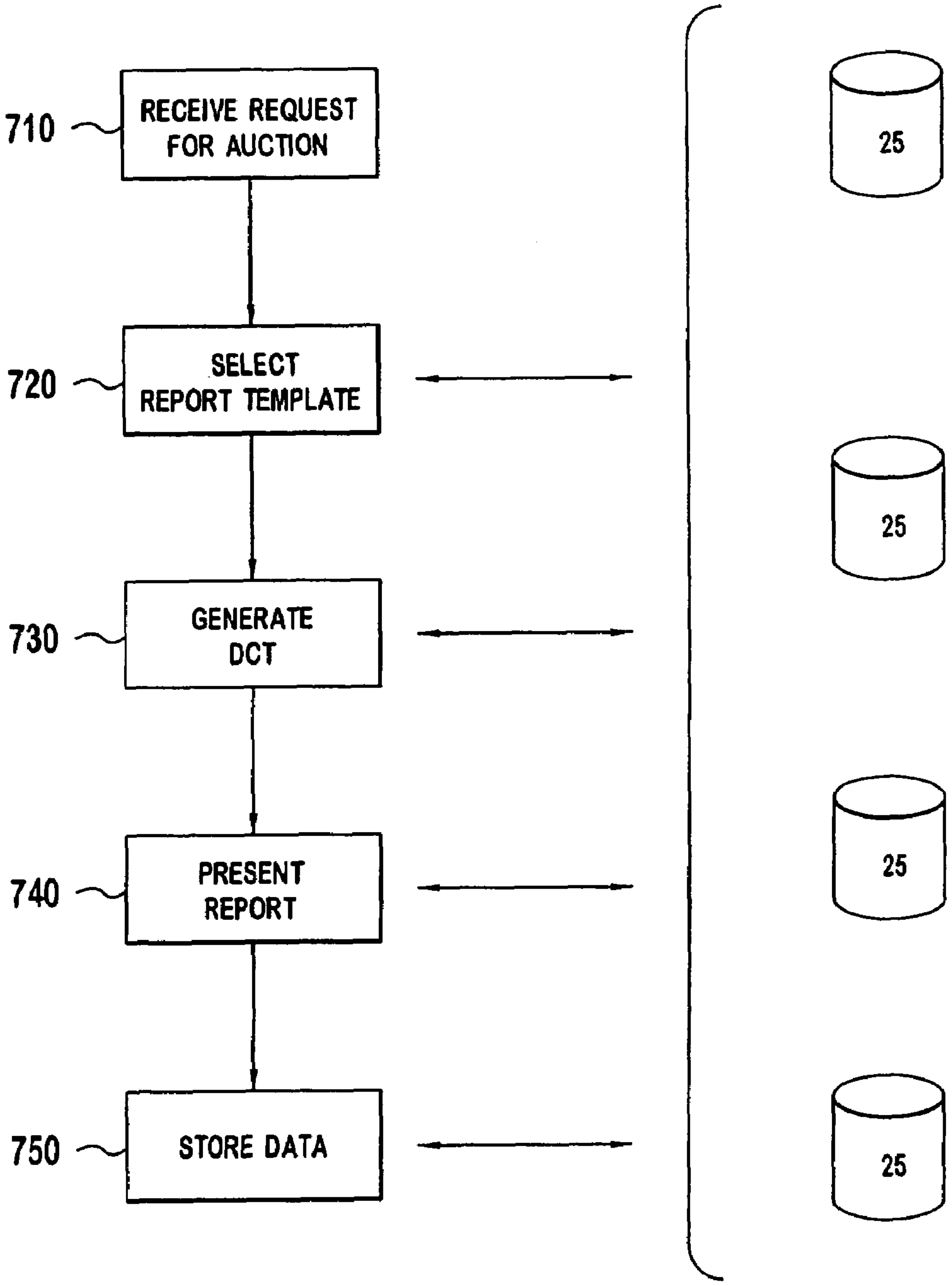
FIG. 7 is a flowchart illustrating one embodiment of the report generation process.
Figure 8:
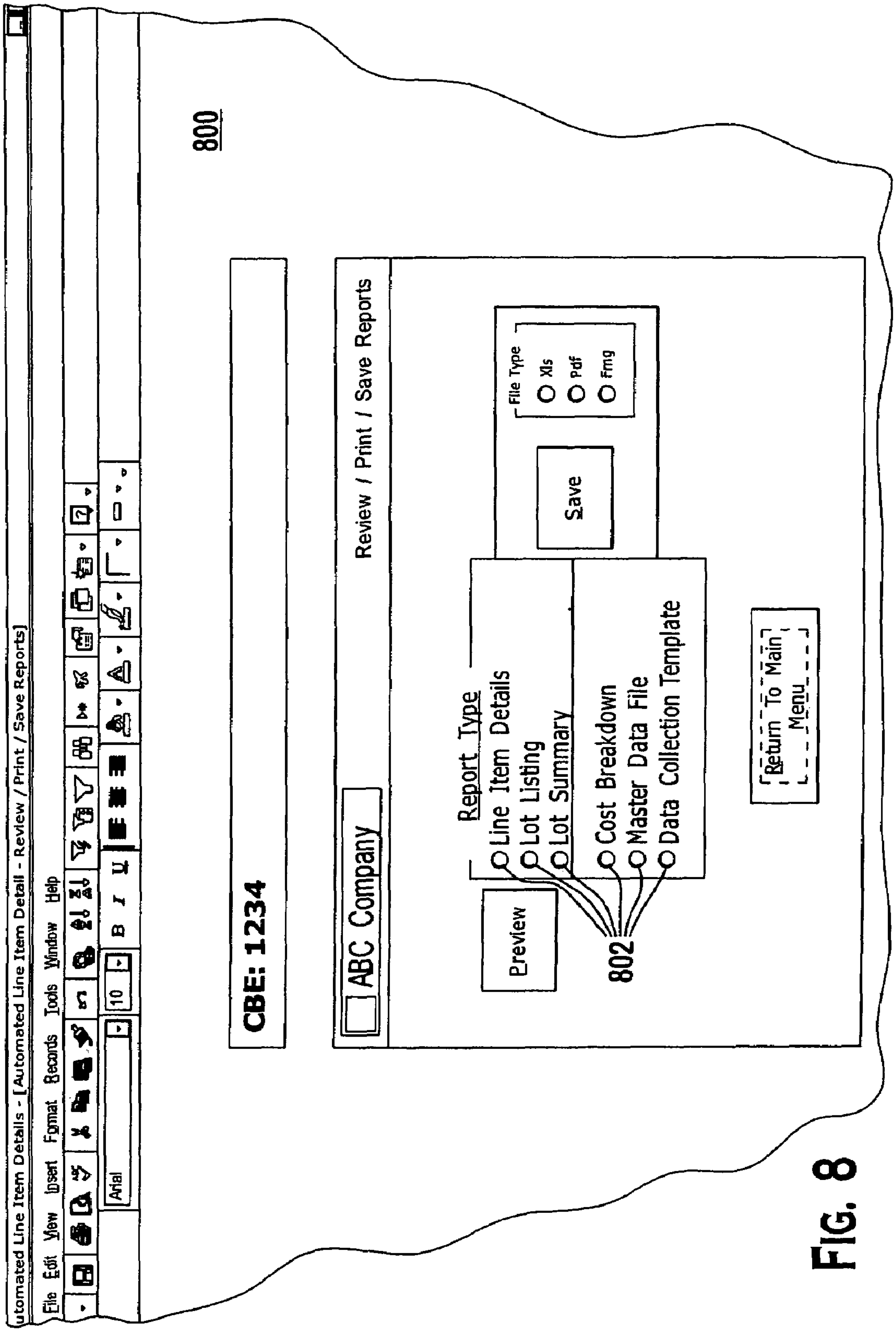
FIG. 8 shows one embodiment of report selection page.

FIG. 7 shows a flowchart illustrating one embodiment of the report generation process, in accordance with the present invention. As shown in the flowchart, in step 710, auctioneer 20 receives from a buyer an initial request to acquire one or more line items in an online auction. Once all relevant data is collected (i.e., by receiving from buyer 10 or retrieving from databases 25), auctioneer 20 can choose the type of report to convey the information to selected suppliers 30. FIG. 8 shows report selection page 800 that can be used to select the type of report. As shown, auctioneer 20 can use report selection page 800 to select a Line Item Detail (LID) report, lot listing report, cost breakdown report, or lot summary report. By selecting a desired report on report control tab 802, auctioneer 20 (or even supplier 30 in some embodiments) can select the desired report type.

It should be apparent that each report serves a different function, and as such, the level of detail is different for each report. For instance, a LID report is very comprehensive, listing full detail regarding items to be acquired in the auction. Note that a LID report typically includes all relevant attributes relating to the line items such that a supplier 30 that receives the report can bid on the items knowingly and intelligently. For instance, a LID report may include, among others, a detailed specification, both quantitative and qualitative data, describing the line items very clearly.

Figure 9:
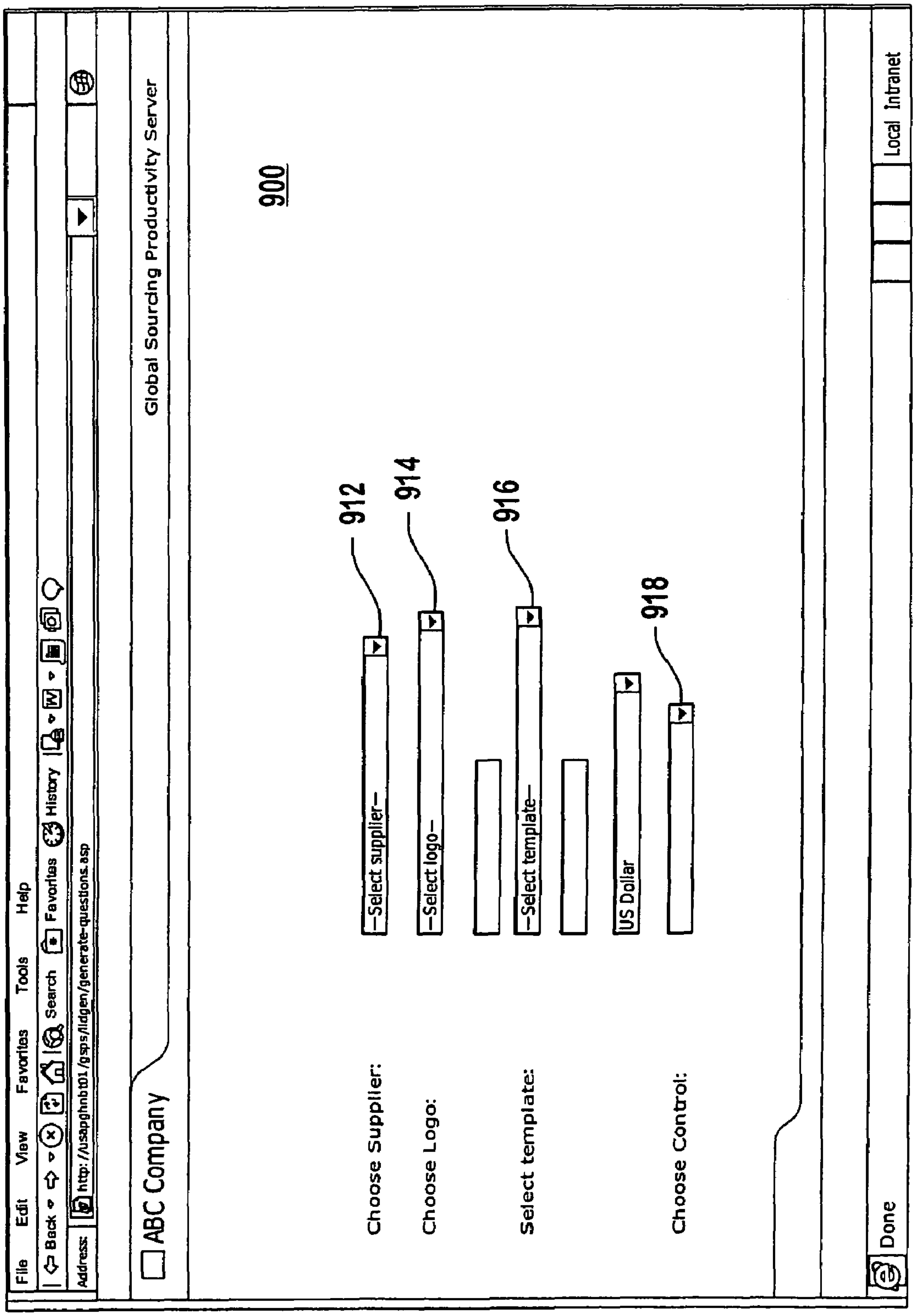
FIG. 9 shows an exemplary web page illustrating one embodiment of the report generation function.

Once the type of report is selected, computer system 50 automatically selects the most appropriate report template from databases 25 in step 720. That is, after receiving the request from the buyer 10, a report template for the chosen type of report is selected. As noted, in accordance with one aspect of the present invention, report templates are stored in electronic form in databases 25. Depending on several factors, such as the type of report chosen, a level of detail to be disclosed, or the identity of supplier, an appropriate template is chosen. As shown in FIG. 9, control page 900 can be used by auctioneer 20 to select the most suitable template. As shown, auctioneer 20 can choose the template in a variety of ways. The report template can be selected by using report template menu 916. Alternatively or additionally, the report template can be selected by choosing a supplier 30 using supplier menu 912. Upon selecting a supplier 30 using supplier menu 912, a number of report templates used for the supplier is shown in report template menu 916.

After selecting a supplier 30, auctioneer 20 can also choose to put a logo on the report using supplier logo menu 914. Supplier logo menu 914 is used in conjunction with supplier menu 912. That is, after selecting a supplier 30 in supplier menu 912, a list of logos, when applicable, will be displayed in supplier log menu 914, which then can be used to select a logo for the supplier 30. It should be noted that control page 900 also includes control tab 918. Control tab 918 is used by auctioneer 20 to control the level of detail of information that would be on the report. Using control tab 918, therefore, auctioneer 20 can control the level of information conveyed to a particular supplier 30.

Figure 10:
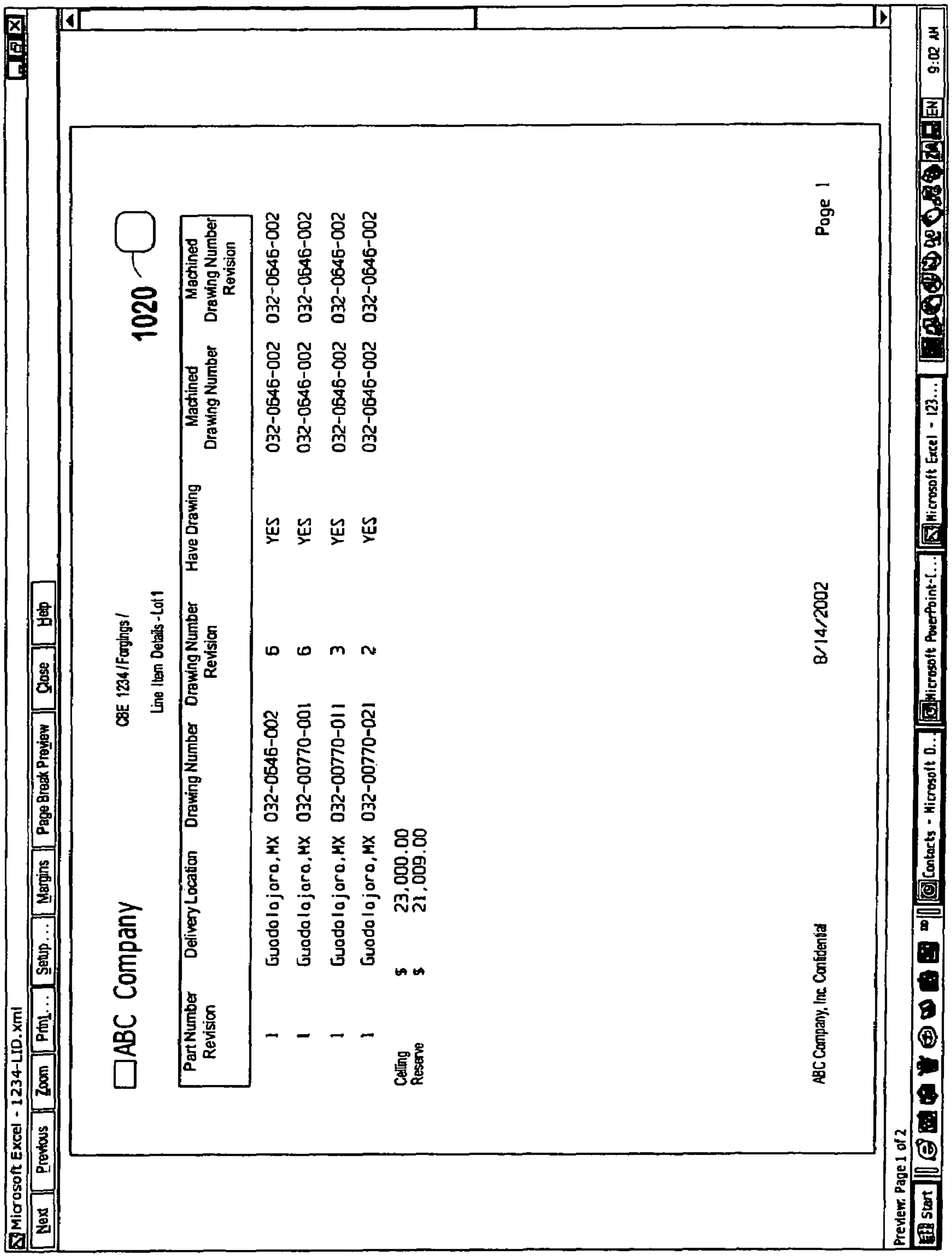
FIG. 10 shows an exemplary detail line item report.

Referring again to FIG. 7, after selecting a report template, a report is generated in step 730. During the report generation process, databases 25 are consulted and relevant information relating to the line items are retrieved. Based on the data available in databases 25 and on the input control by auctioneer 20, a suitable report is generated. FIG. 10 shows an exemplary line item detail report showing certain data. As shown, a supplier logo is displayed in supplier logo area 1020.

In step 740 of FIG. 7, the report is presented to the supplier 30 over network 40. The report can be sent to the supplier in electronic form, such as electronic mail. The report can also be in hard copy and sent to the supplier 30 via post mail. Alternatively, the supplier 30 can log onto the auction network system 100 using a computer and download the report in HTTP format. Since the report can be a web page, supplier 30 can retrieve the report in real time from anywhere using a web browser. In one embodiment, only those suppliers 30 that use computer system 15 over the network system 100 can retrieve the report. In another embodiment, a supplier 30 can use other computer systems, but must log on to the network system 100 using a password.

In step 750 of FIG. 7, data representing the report generation process is stored in databases 25. It should be apparent based on the foregoing description that the report generation process, using the inventive method and system of the present invention is accurate, fast, and reliable.

While the invention has been described in detail and with reference to specific embodiments thereof, it will be apparent to one skilled in the art that various changes and modifications can be made therein without departing from the spirit and scope thereof. For example, while the auction functions described above have been described in the context of downward pricing (reverse) auctions, the auction functions can be equally applied to upward pricing (forward) auctions. Furthermore, while the description above generally focused on electronic auctions, the present invention can be used in a traditional auction setting. In fact, the present invention can also be used in a non-auction setting as well and be equally effective. Thus, it is intended that the present invention covers the modifications and variations of this invention provided they come within the scope of the appended claims and their equivalents.

What is claimed is:

1. In a system for initiating an online auction, a method comprising:

receiving a request to acquire at least one line item from a buyer, wherein the request comprises initial information including at least one attribute describing the item, and wherein the received request does not comprise a complete specification according to a specificity definition associated with the item;

in response to receiving the request, performing at a processor a matching action using the received at least one attribute to create a data collection template, the data collection template having a plurality of cells adaptable for collecting the data;

requesting a complete specification of the item in accordance with the specificity definition by presenting the data collection template to the buyer;

receiving an edited version of the data collection template, the version including at least one cell having information provided by the buyer at a time after the request to acquire at least one line item is received;

generating, in response to at least a portion of the data collected from the buyer, a report showing the data, including at least one of the attributes relating to the line item; and outputting the report to at least one supplier.

2. The method of claim 1, further comprising:

populating the data collection template with the data having the attributes relating to the at least one line item using data from a database.

3. The method of claim 1, wherein the receiving comprises:

grouping a plurality of the line items into a lot, wherein at least one of the line items in the lot is different from at least one other of the line items in the lot.

4. The method of claim 3, wherein the generating comprises:

showing in the report the data having at least one of the attributes relating to each one of the line items in the lot.

5. The method of claim 1, wherein the receiving comprises:

acquiring the request via at least one of a Local Area Network, a Wide Area Network, and the Internet.

6. The method of claim 1, further comprising:

sending the report via at least one of a Local Area Network, a Wide Area Network, and the Internet.

7. The method of claim 1, wherein the generating comprises:

evaluating the data collected from the buyer;

selecting at least one of the attributes of the data; and creating the report with the selected attribute.

8. The method of claim 1, wherein the generating comprises:

evaluating the request received from the buyer;

retrieving the data having the plurality of the attributes relating to the at least one line item from a database; and creating the report using the data.

9. The method of claim 1, wherein the generating comprises:

creating the report in at least one of an electronic copy and a hard copy.

10. The method of claim 1, wherein the generating comprises: constructing a logo representing the supplier in the report.

11. The method of claim 1, wherein the generating comprises:

selecting the report from at least one of a Line Item Detail (LID) report, a lot listing report, a cost breakdown report, and a lot summary report.

12. The method of claim 11, wherein the selecting comprises:

including at least one of the attributes relating to at least one line item in the LID report.

13. The method of claim 12, wherein the including comprises:

choosing at least one of a number of quantity of the line item, a specification of the line item, and a price of the line item.

14. The method of claim 13, wherein the choosing comprises:

including in the price at least one of a reserve price, a market price, a historic price, and a ceiling price.

15. A system for initiating an online auction, comprising:

a processor; and a memory coupled with the processor, wherein the memory is configured to provide the processor with instructions which when executed cause the processor to:

receive a request to acquire at least one line item from a buyer, wherein the request comprises initial information including at least one attribute describing the item, and wherein the received request does not comprise a complete specification according to a specificity definition associated with the item;

in response to receiving the request, perform a matching action using the received at least one attribute to create a data collection template based at least in part on the received attribute, the data collection template having a plurality of cells adaptable for collecting the data;

request a complete specification of the item in accordance with the specificity definition by presenting the data collection template to the buyer;

receive an edited version of the data collection template, the version including at least one cell having information provided by the buyer at a time after the request to acquire at least one line item is received;

generate, in response to at least a portion of the data collected from the buyer, a report showing at least some of the data including at least one of the attributes relating to the line item; and output the report to at least one supplier.

16. The system of claim 15, wherein the memory is configured to provide the processor with instructions which when executed cause the processor to populate the data collection template with the data having the attributes relating to the at least one line item using data from a database.

17. The system of claim 15, wherein receiving the request includes receiving information via at least one of a Local Area Network, a Wide Area Network, and the Internet.

18. The system of claim 15, wherein outputting the report includes sending the report via at least one of a Local Area Network, a Wide Area Network, and the Internet.

19. The system of claim 15, wherein presenting the data collection template includes evaluating the request for the at least one line item received from the buyer, generating the data collection template adaptable for collecting the data relating to the at least one line item, and outputting the data collection template to the buyer.

20. The system of claim 15, wherein generating the report includes evaluating the data collected from the buyer, selecting at least one of the attributes of the data, and creating the report with the selected attribute.

21. The system of claim 15, wherein generating the report includes evaluating the request received from the buyer, retrieving the data having the plurality of the attributes relating to the at least one line item from a database, and creating the report using the data.

22. The system of claim 15, wherein generating the report includes creating the report in at least one of an electronic copy and a hard copy.

23. The system of claim 15, wherein generating the report includes constructing a logo representing the supplier in the report.

24. The system of claim 15, wherein generating the report includes selecting the report from at least one of a Line Item Detail (LID) report, a lot listing report, a cost breakdown report, and a lot summary report.

25. A computer program product for initiating an online auction, the computer program product being embodied in a non-transitory computer readable storage medium and comprising computer instructions for:

receiving a request to acquire at least one line item from a buyer, wherein the request comprises initial information including at least one attribute describing the item, and wherein the received request does not comprise a complete specification according to a specificity definition associated with the item;

in response to receiving the request, performing a matching action using the received at least one attribute to create a data collection template based at least in part on the received attribute, the data collection template having a plurality of cells adaptable for collecting the data;

requesting a complete specification of the item in accordance with the specificity definition by presenting the data collection template to the buyer;

receiving an edited version of the data collection template, the version including at least one cell having information provided by the buyer at a time after the request to acquire at least one line item is received;

generating, in response to at least a portion of the data collected from the buyer, a report showing the data including at least one of the attributes relating to the line item; and outputting the report to at least one supplier.

26. The computer program product of claim 25, the computer program product further comprising computer instructions for:

populating the data collection template with the data having the attributes relating to the at least one line item using data from a database.

27. The computer program product of claim 25, wherein the request is received via at least one of a Local Area Network, a Wide Area Network, and the Internet.

28. The computer program product of claim 25, wherein outputting includes using at least one of a Local Area Network, a Wide Area Network, and the Internet.

29. The computer program product of claim 25, wherein presenting a data collection template to the buyer includes evaluating the request for the at least one line item received from the buyer and generating the data collection template adaptable for collecting the data relating to the at least one line item.

30. The computer program product of claim 25, wherein generating a report includes evaluating the data collected from the buyer and selecting at least one of the attributes of the data.

31. The computer program product of claim 25, wherein generating includes evaluating the request received from the buyer and retrieving the data having the plurality of the attributes relating to the at least one line item from a database.

32. The computer program product of claim 25, wherein generating includes creating the report in at least one of an electronic copy and a hard copy.

33. The computer program product of claim 25, wherein generating includes constructing a logo representing the supplier in the report.

34. The computer program product of claim 25, wherein generating includes selecting the report from at least one of a Line Item Detail (LID) report, a lot listing report, a cost breakdown report, and a lot summary report.

35. In a system for an online auction, a method comprising:

receiving a request from a first computer system communicatively coupled to a network, the request relating to at least one line item, wherein the request comprises initial information including at least one attribute describing the item, and wherein the received request does not comprise a complete specification according to a specificity definition associated with the item;

in response to receiving the request, performing at a processor a matching action using the received at least one attribute to create a line item detail template including a plurality of cells adaptable for receiving inputted data based at least in part on the received attribute;

requesting a complete specification of the item in accordance with the specificity definition by presenting the line item detail template to the first computer system;

receiving an edited version of the line item detail template, the version including at least one piece of data provided by the first computer system at a time after the request to acquire at least one line item is received;

creating a report using at least a portion of the inputted data; and outputting the report to a second computer communicatively coupled to the network.

36. In a system for conducting an online auction, a method comprising:

receiving at a server computer system a request to purchase at least one line item from a buyer computer system via a network, wherein the request comprises initial information including at least one attribute describing the item, and wherein the received request does not comprise a complete specification according to a specificity definition associated with the item;

in response to receiving the request, performing at a processor a matching action using the received at least one attribute to create a data collection template the data collection template having a plurality of cells adaptable for collecting the data;

requesting a complete specification of the item in accordance with the specificity definition by presenting the data collection template to the buyer computer system;

receiving an edited version of the data collection template, the version including at least once cell having information provided by the buyer at a time after the request to acquire at least one line item is received; and outputting to a supplier a report generated from a report template, wherein the report template is automatically selected from a plurality of report templates.

37. The method of claim 36, wherein the presenting comprises:

outputting the data collection template in at least one of a HyperText Markup Language format and a Extensible Markup Langue (XML) format.

38. The method of claim 36, wherein the receiving comprises:

obtaining the data collection template in at least one of a HyperText Markup Language format and a Extensible Markup Langue (XML) format.

39. The method of claim 36, wherein the presenting comprises:

creating the data collection template that follows a spreadsheet application.

40. The method of claim 39, wherein the presenting comprises:

creating the data collection template that includes a set of customized macros that facilitate collection of the data.

41. The method of claim 40, wherein the creating comprises:

including customized macros that perform at least one of a generation of the data collection template, an importation of the data collection template, a validation the data collection template, an application of selected formulas to the data collection template, and a searching of duplicate records from the data collection template.

42. The method of claim 40, wherein the performing comprises:

having at least one of the customized macros to execute at least two distinct functions, one of which is executable at the buyer computer system and other is executable at the server computer system.

* * * * *

UNITED STATES PATENT AND TRADEMARK OFFICE

CERTIFICATE OF CORRECTION

PATENT NO. : 7,693,747 B2
APPLICATION NO. : 10/284726
DATED : April 6, 2010
INVENTOR(S) : Bryson et al.

It is certified that error appears in the above-identified patent and that said Letters Patent is hereby corrected as shown below:

Column 16, Claim 36, Line 67:
delete "once" and insert -- one --
Column 17, Claim 37, Line 10:
delete "Langue" and insert -- Language --
Column 17, Claim 38, Line 15:
delete "Langue" and insert -- Language --

Signed and Sealed this
Thirtieth Day of October, 2012

David J. Kappos
*Director of the United States Patent and Trademark Office*